Figure 1:
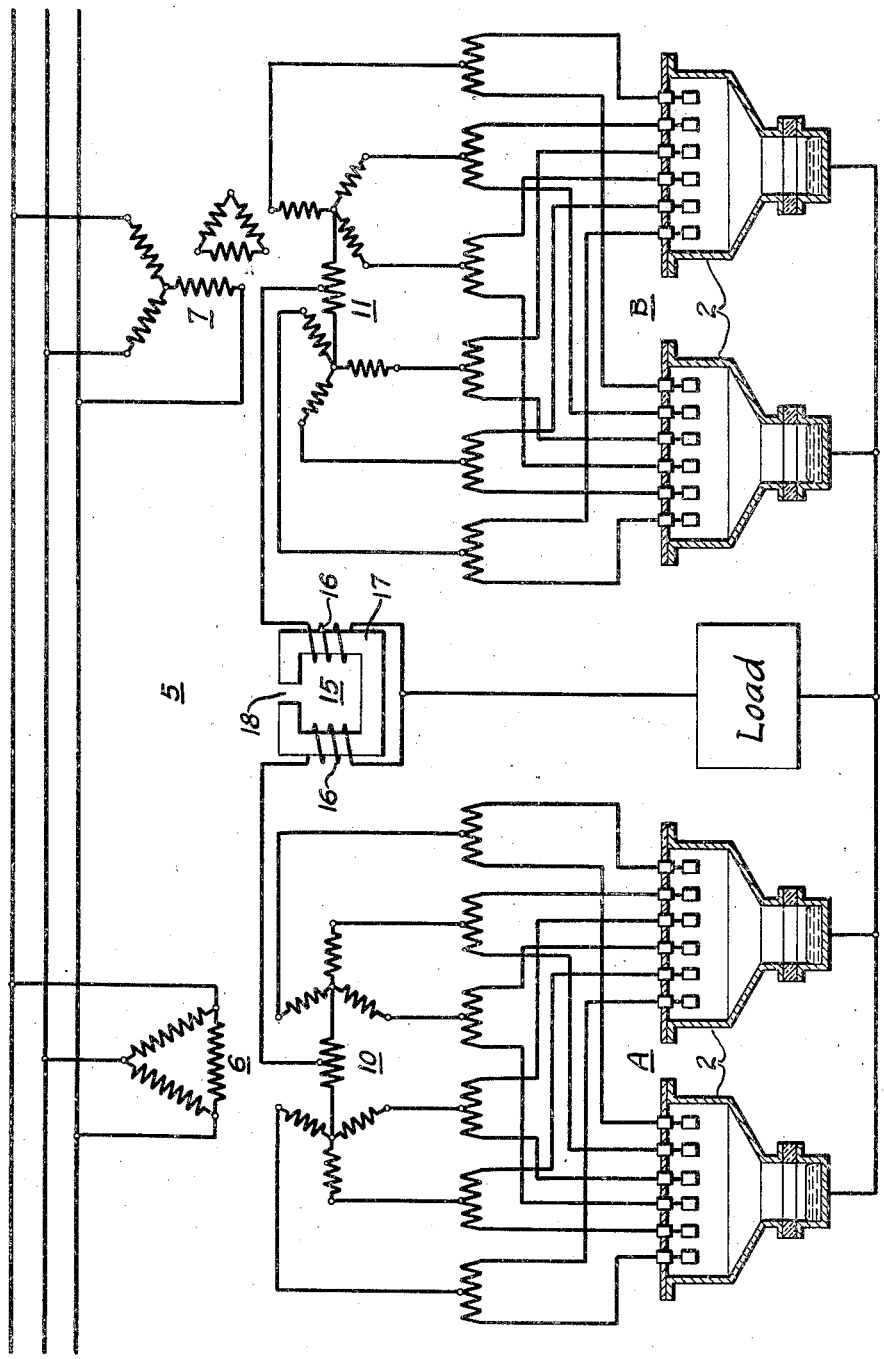

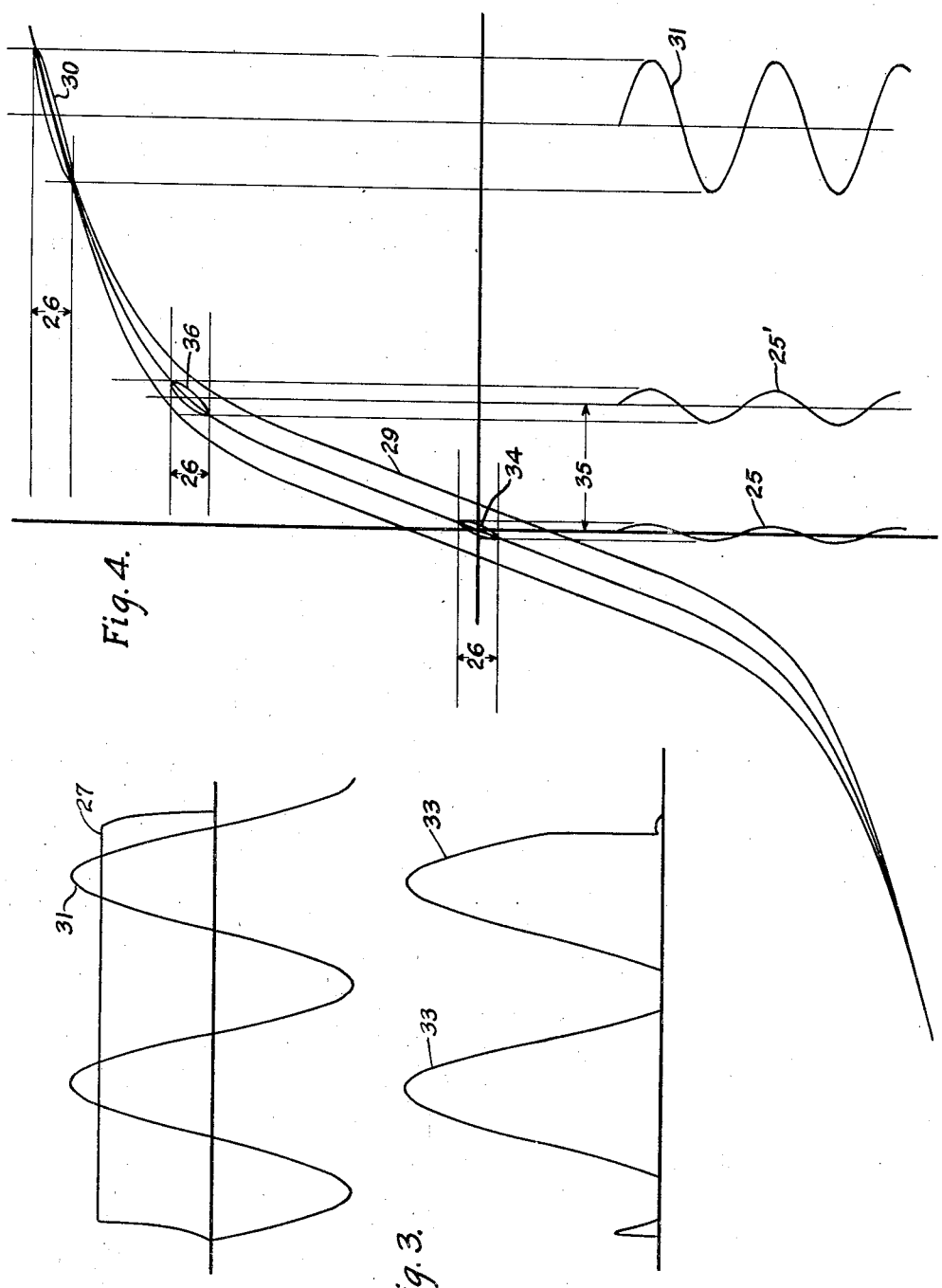

UNITED STATES PATENT OFFICE 2,128,055

ELECTRIC CONVERSION SYSTEM

Herbert A. Rose, Pittsburgh, Pa., assignor to Westinghouse Electric & Manufacturing Company, East Pittsburgh, Pa., a corporation of Pennsylvania Application August 31, 1936, Serial No. 98,743

6 Claims. (Cl. 175—363)

My invention relates to a vapor electric conversion system, and particularly to a sectionalized converter having an interphase transformer for maintaining multiple phase operation of the conversion system during unbalanced load conditions on the converter.

In the operation of sectionalized vapor electric converters, it has been found desirable to divide the rectifier sections into a plurality of groups and to operate the groups with a displaced phase arrangement in order to secure the effect of multiplied phases and a reduced ripple effect in the resulting direct current.

One of the principal advantages of the sectionalized converter is its ability to operate with one or more of the sections idle and still maintain at least a portion of the load capacity. Heretofore, when operating at a multiplied phase arrangement, the disabling or removing from service of one or more of the converter sections has resulted in unbalance of the interphase transformers and the nullification of their operation with the resultant production of undesirable harmonics in the sections, the load and the supply circuits.

It is an object of my invention to provide a conversion system in which one or more of the converter sections may be made inoperative without disturbing the overall mode of operation or further production of undesirable harmonics.

It is a further object of my invention to provide an interphase transformer capable of maintaining its transformer action with greatly unbalanced direct currents in its windings throughout the normal operating ranges of load.

I have discovered that alternating current and direct current act to produce different results when applied to a magnetic core, in effect the direct current acts on the length of the core to produce saturation while the alternating current acts on the cross section to produce a change of flux per unit area. Therefore, by increasing the length and decreasing the magnetizing turns the effect of the direct current can be reduced while by increasing the cross section the effect of the alternating current is enhanced. The interphase transformer, according to my invention, has a relative large air gap structure to increase the effective core length thus minimizing the saturation while the cross section is relatively large so that the required flux change can be produced by a small current acting in a few magnetizing turns.

One of the outstanding advantages of the sectionalized converter is its inherent suitability for operation at fractional capacity. In the past, this type of operation has been limited to transformer circuits in which no direct current unbalance could occur. My invention extends the useful range of application of the sectional converter by permitting its use with transformer circuits where direct current unbalance will obtain under some modes of fractional operation. By fractional operation, I mean operation with one or more sections out of service or the current in one or more sections materially reduced with respect to the current in the remaining sections.

These results are accomplished according to my invention by providing a plurality of groups of converter sections and feeding each group from substantially independent transformer secondary windings. The transformer secondary windings being so arranged that the respective terminal voltages are displaced in phase relation to multiply the effective operating phases. These secondary windings are separated by an interphase transformer for absorbing the voltage differences during operation. For example, assuming two rectifier sections in each group of a 12 phase sectionalized converter, if one section in either group is removed from service for any reason, the direct currents in the tripping frequency interphase transformer will be fed to the groups at a ratio of approximately 2:1, so that there is a strong unbalanced direct current magnetization in the core material of the interphase transformer with the result that it becomes uneffective to adequately perform its function. In order to minimize the results of this direct current saturation, I have provided a winding having relatively few magnetizing turns but with a core of relatively large cross-section, so that it develops the required voltage while operating on the substantially unsaturated portion of the magnetization curve, and with an air gap arrangement sufficient to prevent saturation by the unbalanced direct current.

It is a further object of my invention to provide an interphase transformer which will develop the required voltages under unbalanced condition of operation with substantially small increase in exciting current over wide ranges of load on the converter.

It is a further object of my invention to provide an interphase transformer capable of effective operation at low exciting current with large amounts of unbalanced direct current in its windings.

It is a further object of my invention to provide an interphase transformer for use with converter circuits subject to unbalanced or fractional capacity operation in which the exciting current is taken by the interphase transformer under all conditions of operation.

Figure 2:
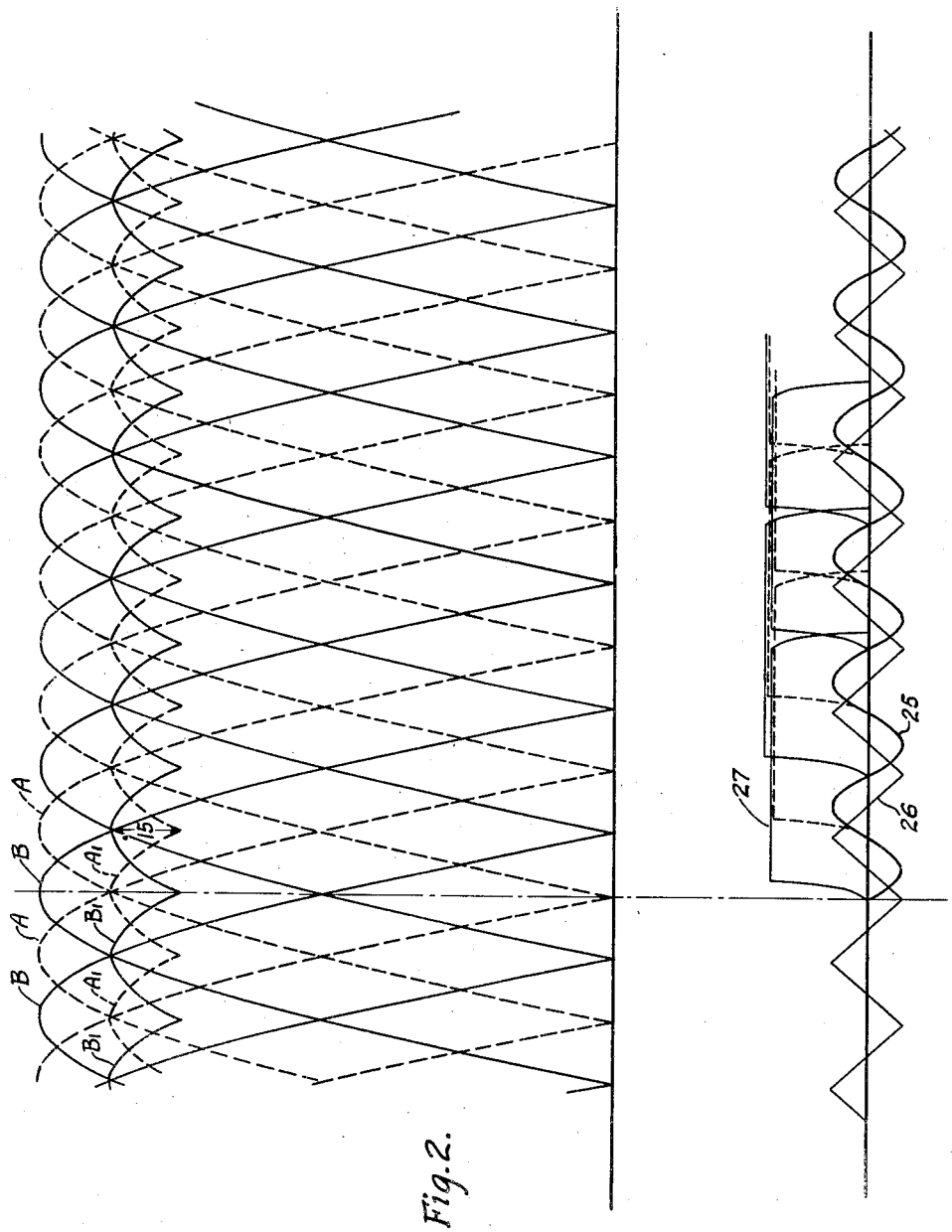

Other objects and advantages of my invention will be apparent from the following detailed description taken in conjunction with the accompanying drawings in which:

Figure 1 is a schematic illustration of a sectionalized converter according to my invention, Fig. 2 is a diagrammatic illustration of the current and voltage conditions in my converter system, Fig. 3 is a graphical illustration of the undesirable results of interphase saturation, and Fig. 4 is a diagrammatic illustration of the excitation characteristics of my improved interphase transformer.

In the illustrated embodiment of my invention, the sectionalized converter having a plurality of converter sections 2 is arranged to have two groups A—B of converter sections 2, each group A—B having two rectifier sections 2, each group of rectifier sections being fed by a double three-phase secondary winding of a suitable rectifier transformer 5 illustrated herein as a delta Y-Y 6 and a Y-double connection 7, the use of the delta-Y primaries giving the necessary phase displacement to the terminal voltages of the secondary windings 10—11 to produce substantial twelve-phase operation. Obviously, other transformer arrangements such as delta quadruple zig-zag could be utilized for securing the desired phase displacement.

The double three-phase secondaries 10—11 are separated from each other by my improved interphase transformer 15 having a winding 16 of relatively few turns and a core 17 of large cross-section, so that a relatively small magnetizing current will produce the necessary potential to maintain the secondary windings 10—11 operating at the desired phase displacement. In order to prevent saturation of the interphase core 17 by unbalanced direct current in the interphase windings 16 when one or more of the converter sections 2 is removed from service, I provide the interphase transformer core 17 with an air-gap arrangement 18 of sufficient size to prevent saturation by the unbalanced direct current.

In the operation of the conversion system according to my invention, the groups A—B of rectifier sections 2 will operate with a displaced, or multiplied phase arrangement as best illustrated in Fig. 2. One group of sections 2, for instance, the right-hand section B, will operate with a double 3-phase arrangement as shown by the heavy lines B—B1, while the other group of sections A will operate with a double 3-phase arrangement A—A1 displaced 30 electrical degrees, producing in effect a 12-phase ripple in the resulting direct current voltage. Fitting between the two double 3-phase groups A—B is my improved interphase transformer 15, this interphase transformer takes a magnetizing current 25 as indicated in the sub-figure in order to develop the necessary voltage 26 for maintaining normal 12-phase operation of the system. The exciting current 25 as shown being small with respect to the anode or load currents 27 of the converter.

In the heretofore known interphase transformers, the disabling or removing from service of one of the rectifier sections of a multiplied phase converter has resulted in the saturation of the interphase transformer core so that the iron of the core operates above the knee of its magnetization curve 29 as indicated at 30 in Fig. 4. This results in such a large increase of magnetization current to develop the voltage that the magnetization current 31 frequently exceeds the anode or load currents, so that the current through the rectifier anodes contain heavy harmonics or become a series of impulses or peaks 33 as indicated in Fig. 3. This adversely affects the operation of the rectifier, produces objectionable harmonics in the system and causes excess heating of the transformer windings.

By providing an interphase transformer 15, according to my invention, having a relatively small number of magnetizing turns 16 coupled with core section 17 of large cross-section so that at normal operation the required operating voltage 26 is produced by utilizing only a relatively small flux change well below the saturation point of the iron, as shown at 34 on the magnetization curve 29 of Fig. 4. The small flux change required to generate the voltage 26 is produced by a small exciting current 25. The large air-gap 18 in core 17 prevents saturation of the core 17 by unbalanced direct current when one of the sections is inoperative. The direct current while not saturating the core does, however, produce a magnetic bias 35 so that operation is moved from point 34 to a point 36 approaching but below the knee of the magnetization curve 29, so that regardless of the bias 35, the potential 26 is generated by a small exciting current 25', so that the magnetizing current 25 does not exceed the load current 27 except at very small loads on the converter system, at which time the resultant disturbances are of such minor nature as to be negligible in effect.

While for the purposes of illustration I have shown and described a specific modification of my invention, it will be apparent that many changes and modifications can be made therein without departing from the true spirit of my invention as indicated in the accompanying claims.

I claim as my invention:

1. An electric current converting system comprising a sectionalized converter having four substantially identical sections, a supply transformer having a three-phase primary winding and two substantially independent double three-phase secondary windings, each of said secondary windings feeding two converter sections, said converter sections operating in parallel, said secondary windings being so connected that the terminal voltages are displaced with respect to each other, an interphase transformer connected between said secondary windings, said interphase transformer generating a voltage causing said converter to operate double-double three-phase, said interphase transformer having a core provided with a non-magnetic portion to prevent saturation of said core by unbalanced direct current when operating with one section out of service.

2. An electric current converting system comprising a converter having a plurality of substantially similar sections, a supply transformer having an $n$-phase primary winding, and a plurality of double-$n$-phase secondary windings, said secondary windings having terminal voltages normally displaced relative to each other, a plurality of converter sections connected to each of said secondary windings, an interphase transformer associated with said system to secure multiple-$n$-phase operation of said converter, a core in said interphase transformer having a substantially non-magnetic section of such length that the core is not saturated by unbalanced direct current when one of said converter sections is out of service.

3. An electric current converting system comprising a sectionalized converter having a plurality of substantially similar sections, a supply transformer having an $n$-phase primary winding, and two double-$n$-phase secondary windings, said secondary windings having terminal voltages normally displaced relative to each other, a plurality of converter sections connected to each of said secondary windings, an interphase transformer connected to secure quadruple-$n$-phase operation of said converter, a core in said interphase transformer having a substantially non-magnetic section of such length that the core is not saturated by unbalanced direct current when one of said converter sections is out of service, the cross-section of said core being so proportioned with respect to the winding turns thereon that the magnetizing current of said transformer is substantially unchanged by unbalanced direct current in said winding.

4. A vapor electric conversion system comprising at least four valve groups, a transformer having two substantially independent secondary winding sections, the terminals of each winding section being connected to two valve groups, the two valve groups connected to a winding section being operated in parallel, the winding sections of said transformer being so arranged that the valve groups connected to one winding section operate in displaced phase relation with respect to the valve groups connected to the other winding section, an interphase transformer connected between said winding sections for securing a multiplied phase operation for the converter, said interphase transformer having a relatively small number of winding turns and a relatively large cross section core and a gap in said core of sufficient length to prevent saturation of said core by unbalanced current in the event of non-operation of one of said valve groups.

5. An electric current converting system comprising a converter having a plurality of substantially similar sections, a supply transformer having an $m$-phase primary winding, and a plurality of multi-$m$-phase secondary windings, said secondary windings having terminal voltages normally displaced relative to each other, a plurality of converter sections connected to each of said secondary windings, an interphase transformer associated with said system to secure multiple-$m$-phase operation of said converter, a core in said interphase transformer having a substantially non-magnetic section of such length that the core is not saturated by unbalanced direct current when one of said converter sections is out of service.

6. An electrical conversion system comprising a sectionalized vapor electric converter having a plurality of substantially identical sections, transformer means including a plurality of substantially independent winding means for distributing current to the sections of said converter, each of said winding means supplying current to a plurality of converter sections, said winding means being so arranged that the rectifier sections fed by one of said winding means operates with a displaced phase position with respect to the sections fed by the remaining winding means, an auxiliary transformer connected between said winding means for controlling the operation of said converter and means for maintaining the effectiveness of said auxiliary transformer when one of said converter sections fails to carry current.

HERBERT A. ROSE.